United States Patent [19]

Joice-Cavanagh

[11] 4,396,325

[45] Aug. 2, 1983

[54] CARGO BRACING PANEL

[75] Inventor: Roland R. Joice-Cavanagh, Woodside, Calif.

[73] Assignee: Bishop-Wisecarver Corporation, Pittsburgh, Calif.

[21] Appl. No.: 257,380

[22] Filed: Apr. 24, 1981

[51] Int. Cl.³ .................... B60P 7/14; B61D 45/00; B63B 25/24

[52] U.S. Cl. .................... 410/129; 410/118; 410/121; 410/151

[58] Field of Search ............ 410/121, 127, 128, 129, 410/145, 146, 149, 151, 118, 122

[56] References Cited

U.S. PATENT DOCUMENTS

| | | | |
|---|---|---|---|
| 923,463 | 6/1909 | Taylor | 410/151 |
| 982,571 | 1/1911 | Brown | 410/127 X |
| 1,951,660 | 3/1934 | Klaudt | 410/145 X |
| 2,565,997 | 8/1951 | Stone | 410/129 |
| 2,594,208 | 4/1952 | Pilot | 410/129 |
| 2,612,848 | 10/1952 | Sowden | 410/151 |
| 3,049,328 | 8/1962 | Bishop | 410/151 X |
| 3,171,627 | 3/1965 | Tapley et al. | 410/146 X |
| 3,329,388 | 7/1967 | Barber | 410/151 X |
| 3,850,332 | 11/1974 | Marko | 410/127 X |
| 3,880,394 | 4/1975 | Wisecarver | 410/151 X |
| 4,023,819 | 5/1977 | Holman, Jr. | 410/151 |

FOREIGN PATENT DOCUMENTS 833030 4/1960 United Kingdom ............ 410/129

Primary Examiner—Bruce H. Stoner, Jr.
Assistant Examiner—Howard Beltran
Attorney, Agent, or Firm—Manfred M. Warren; Robert B. Chickering; Glen R. Grunewald

[57] ABSTRACT

A vertical bulkhead is constructed for insertion in the interior of a cargo transporting vessel such as a truck, freight car, or marine cargo carrier to support the cargo during movement of the vessel. The bulkhead is constructed of any suitable stiff material and has positioned upon it a pair of pads or bearing elements at opposite edges disposed to frictionally engage opposite inner walls of the vessel. One of these pads is mounted on an adjustable mechanism disposed to move the pad horizontally and to lock it and consequently lock the bulkhead in a fixed position inside the vessel against the cargo.

6 Claims, 5 Drawing Figures

CARGO BRACING PANEL

BACKGROUND OF THE INVENTION

The problem of safely bracing cargo in transit has existed for some time and several attempts have been made to solve it.

The closest prior art known to applicant is represented by U.S. Pat. No. 3,049,328 to Bishop. This discloses a telescoping cylindrical rod operated by means of a handle engaging a rack and pinion which operates the telescoping elements of the bar and causes it to engage opposite walls of a carrier and thus provide a bracing effect.

U.S. Pat. No. 3,880,394 to Wisecarver discloses a bracing device having a hollow tube and a concentric screw member which may be operated by a nut and wrench attachment forming an integral part of the mechanism in order to change the length of the overall assembly and thus provide a bracing effect.

None of the prior art presently known to applicant teaches the use of a bulkhead equipped with an adjustable or extensible means for holding such a bulkhead in position in the interior of a transportation vessel to protect the cargo from damage during movement of the vessel.

DESCRIPTION OF A PREFERRED EMBODIMENT

Figure 1:
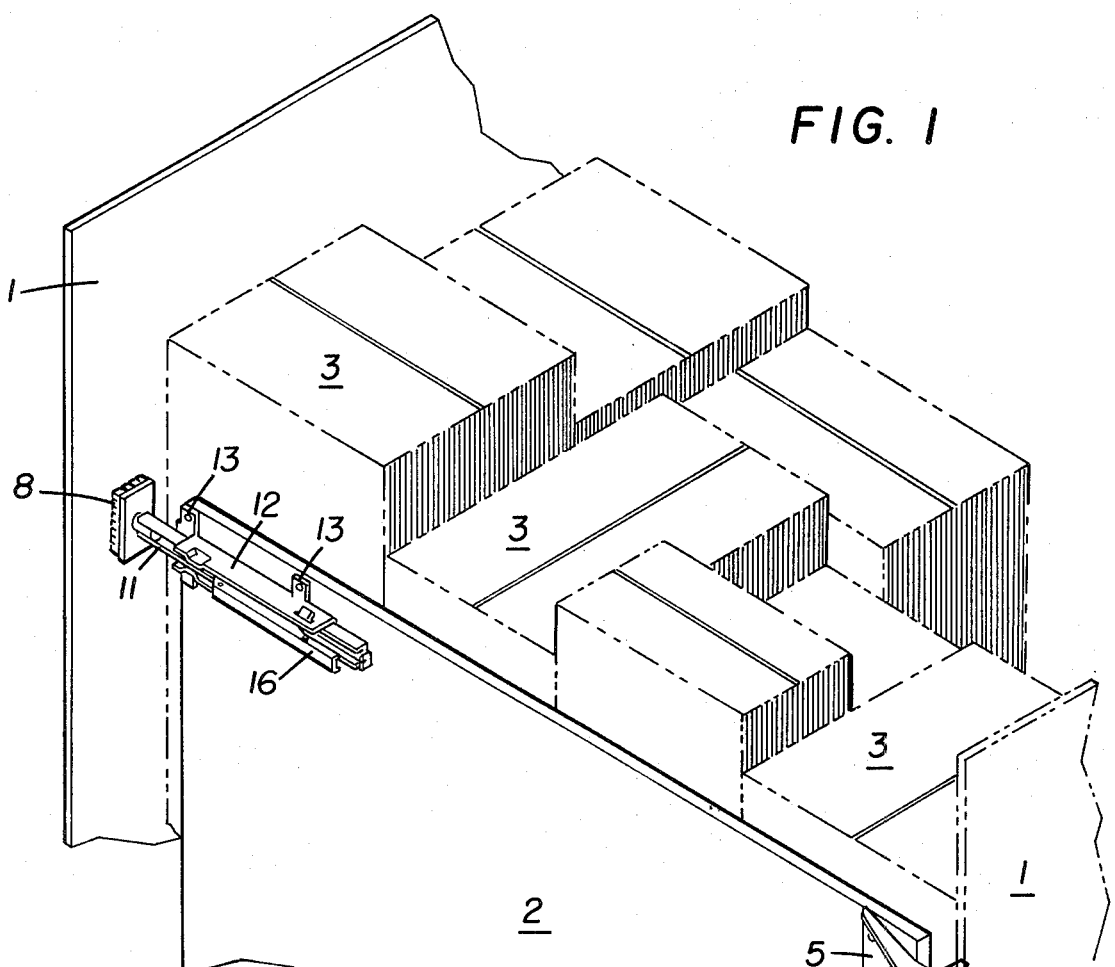
FIG. 1 is an isometric view of the bulkhead in position showing pads bearing on interior walls and holding cargo in position.
Figure 2:
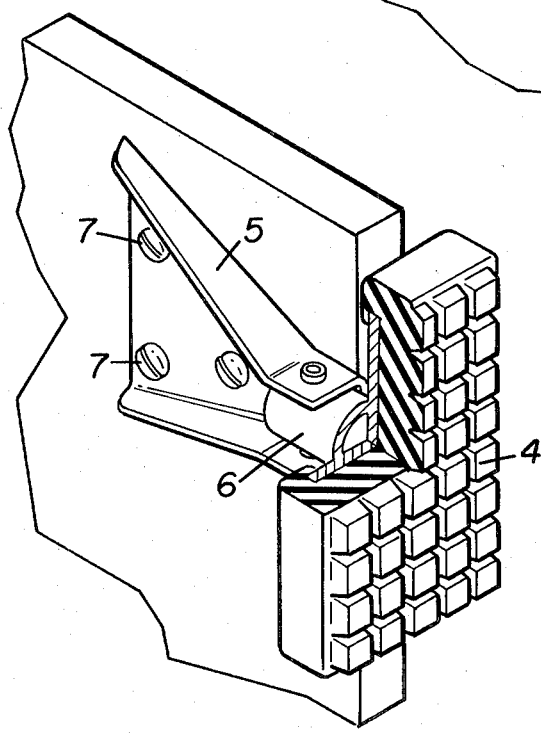
FIG. 2 is an isometric view showing the stationary pad in position of the bulkhead.

Referring first particularly to FIG. 1 and FIG. 2 there is seen first the interior walls 1 of a cargo transporting vessel with my bulkhead 2 positioned therein. Miscellaneous cargo being held in position by bulkhead 2 is shown at 3. My first or stationary pad or bearing element which I prefer to make of any suitable elastomeric material and having a checkerboard surface, is shown at 4. This is joined to a bracket 5 through a connector member 6 and fastened to the surface of bulkhead 2 by means of screws 7.

Figure 3:
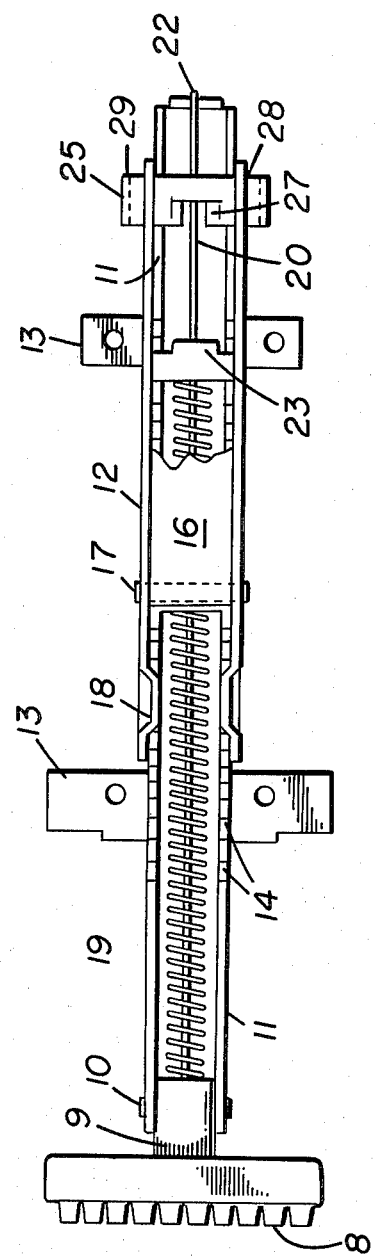
FIG. 3 is a top view partially cutaway showing the mechanism for operation of the movable pad or bearing element.
Figure 4:
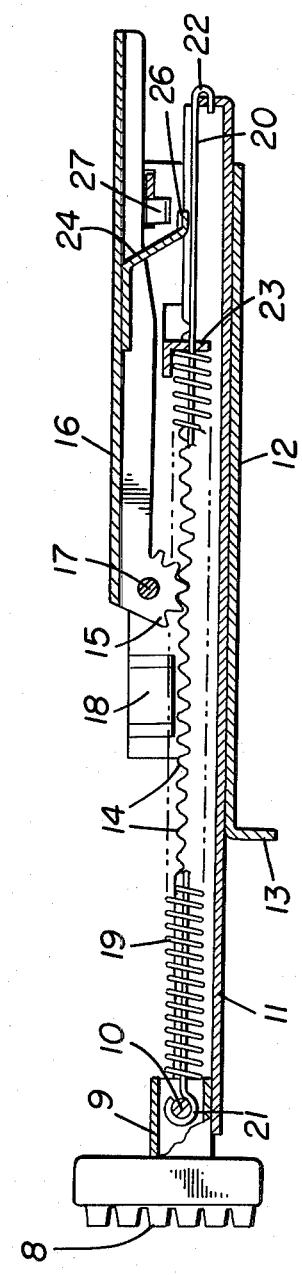
FIG. 4 is a side view partly in section of the mechanism of FIG. 3.

At the opposite vertical edge of bulkhead 2 is pad or bearing element 8 which is similar to pad 4 but is adjustably supported by a positioning mechanism shown in FIG. 3 and FIG. 4.

Referring to the latter figures there is seen a pad connector 9 which is attached by a cross pin 10 to "U"-shaped sliding mechanism 11 which latter in turn is adapted for riding back and forth in also "U"-shaped guide member 12. Guide member 12 is secured to bulkhead 2 by means of cleats 13.

Slide member 11 has cut upon its upper edges the teeth of a rack 14 which meshes with pinion 15 forming a part of handle 16. Pinion 15 is rotated about pin 17 by handle 16 in engagement with the teeth of rack 14 causing a backward and forward motion of "U"-slide member 11. This motion is transmitted through connector 9 and cross pin 10 to adjust position of pad 8. When handle 16 is rotated around approximately 180° counterclockwise viewing FIG. 4, pinion 15 is out of mesh with rack 14, thus permitting free sliding action of the "U"-slide 11. The sides of guide 12 are crimped inwardly at 18 and this configuration acts to limit the counterclockwise rotary motion of handle 16 inside guide 12.

It is thus seen that by manipulation of handle 16 I may force adjustable pad 8 against interior wall 1.

In order to increase the flexibility of my mechanism I may employ a spring 19 disposed for operation on spring guide 20 which is anchored at 21 on cross pin 10 and on its opposite end at 22 on "U"-slide 11. The expansion of spring 19 is limited by spring stop 23 across guide 12.

The function of spring 19 is best understood by reference to FIG. 4. Motion of handle 16 in a clockwise direction causes movement of the slide member 11 by the action of pinion 15 on rack teeth 14 to the left. The spring stop 23 compresses spring 19 against pad 8 and interior wall 1. Subsequent manipulation of handle 16 tightens the pressure on the pad. The action of the latch and locking mechanism described below serves to maintain handle 16 in a latched condition. Spring 19 is in compression but the force against wall 1 by pad 8 through connector 9 and cross pin 10 is maintained by rack 14 and pinion 15, once they are engaged, not by spring 19.

Figure 5:
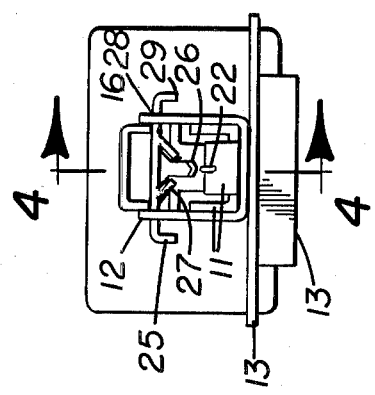
FIG. 5 is an end view of the latching mechanism for the device of FIGS. 3 and 4.

In order to maintain my adjustable pad 8 in a fixed position against interior wall 1, I employ a special latch and locking mechanism best seen on FIG. 5.

From the underside of handle 16 extends handle latching arm 24 at the outer end of which is a horizontal "V"-shaped handle latch 26. A latch slide 25 is slidable across guide 12 in slots 28 in the sides of guide 12. The motion of slide 25 is limited by stops at its ends 29. One edge of slide 25 opposite the end of handle 16 is notched out to form a pair of prongs 27 projecting inwardly of the guide 12. The space between the ends of prongs 27 is just sufficient for the passage of "V"-shaped latch 26 therethrough when latch slide 25 is centrally located in guide 12.

When the entire device is in operating position on the bulkhead as shown in FIG. 1 its longitudinal axis is in a generally horizontal position and the latch slide 25 is consequently in a vertical position. The latch slide 25 drops by gravity so that its prongs fall out of registry with "V"-shaped latch 26 and obstruct the passage of latch 26 through the space between the prongs thus preventing manipulation of handle 16 and maintaining the entire mechanism in a locked position.

When it is desired to unlock the mechanism, the slide latch 25 is pushed up manually so that latch 26 is in alignment with the opening between prongs 27 permitting "V"-shaped latch 26 to pass between prongs 27 and releasing the handle 16 for rotation and operation of the mechanism as described above. Handle 16 extends beyond the latching arm 24 and beyond the adjacent end of the entire assembly, thus facilitating its manipulation.

Movement of latch slide 25 to a central position to register the space between prongs 27 with the "V"-shaped handle latch 26 permits handle 16 to be raised, thus operating the pinion 15 on rack 14 and releasing pad 8 from its engagement with wall 1. This permits removal of bulkhead 2 until it is again reinstalled to hold a new batch of cargo 3.

I claim:

1. An extensible foot assembly for mounting to a cargo support member to enable use of the member for shoring of cargo in a transportation container, said foot assembly including a body portion formed for mounting to said support member, an extensible element movably mounted to said body portion and having a bearing portion formed to engage and bear against a wall of said container, and adjustment means formed for advancement of said extensible element relative to said body portion and formed for securement of said extensible element in an advanced position to apply a bearing force to said wall, wherein the improvement in said foot assembly is comprised of:

said adjustment means including spring biasing means formed and mounted to apply a biasing force between said body portion and said extensible element in a direction urging said extensible element toward said advanced position; and said adjustment means further including juxtapositioned advancement means formed for selective coupling to said extensible element for positive advancement of said extensible element toward said advanced position and formed for uncoupling form said extensible element to free said extensible element for displacement independently of said advancement means as urged by said spring biasing means.

2. The extensible foot assembly as defined in claim 1 wherein, said advancement means is formed as a rack of teeth on said extensible element and pinion means rotatably mounted to said body portion and formed to mate with said rack of teeth, said pinion means including a manually engageable handle coupled for rotation of said pinion means.

3. The extensible foot assembly as defined in claim 2 wherein, said adjustment means includes latch means formed for locking of said handle in a fixed position for securement of said extensible element in said advanced position.

4. The extensible foot assembly as defined in claim 1 wherein, said body portion includes mounting means formed for securement of said foot assembly to a partition-like cargo support member.

5. A cargo supporting device for use in shoring cargo in a transportation container including a cargo support member, and pair of foot assemblies mounted to opposite sides of said cargo support member, said foot assemblies being formed to engage and bear upon opposite walls of said container at least one of said foot assemblies being formed with an extensible element and adjustment means formed for advancement of said extensible element against one of said walls and securement of said extensible element in an advanced position, wherein the improvement in said cargo support assembly is comprised of:

said cargo support member is formed as a partition-like member; and said one of said foot assemblies is formed for a resilient displacement of said extensible element and automatic application of a bearing force against said walls during placement of said partition-like member, and said one of said foot assemblies is further formed with juxtapositioned advancement means for positive application of an increased bearing force against said walls during advancement of said extensible element to said advanced position.

6. The cargo support assembly as defined in claim 5 wherein, said adjustment means on said one of said foot assemblies is formed to resiliently bias said extensible element for displacement toward said advanced position, and said adjustment means further includes positive advancement means formed for engagement with said extensible element and formed for positively driven displacement of said extensible element between said advanced position and a position enabling disengagement of said advancement means from said extensible element.

* * * * *